(12) United States Patent
Jansson

(10) Patent No.: US 7,909,544 B2
(45) Date of Patent: Mar. 22, 2011

(54) CUTTING INSERT AND TOOL FOR CHIP REMOVING MACHINING

(75) Inventor: Mikael Jansson, Avesta (SE)

(73) Assignee: Seco Tools AB, Fagersta (SE)

( * ) Notice: Subject to any disclaimer, the term of this patent is extended or adjusted under 35 U.S.C. 154(b) by 369 days.

(21) Appl. No.: 12/329,116

(22) Filed: Dec. 5, 2008

(65) Prior Publication Data

US 2009/0155004 A1 Jun. 18, 2009

(30) Foreign Application Priority Data

Dec. 13, 2007 (SE) ...................................... 0702767

(51) Int. Cl.
*B23C 5/02* (2006.01)
*B23C 5/20* (2006.01)

(52) U.S. Cl. ........... 407/42; 407/114; 407/100; 407/103

(58) Field of Classification Search .................... 407/42, 407/48, 113, 114, 115, 116, 103, 100
See application file for complete search history.

(56) References Cited

U.S. PATENT DOCUMENTS

| | | | |
|---|---|---|---|
| 3,800,379 A * | 4/1974 | Hopkins | ....................... 407/113 |
| 4,597,695 A | 7/1986 | Johnson | |
| 5,472,371 A * | 12/1995 | Yamakura et al. | ............... 451/56 |
| 6,244,791 B1 * | 6/2001 | Wiman et al. | .................. 407/114 |
| 2006/0045636 A1 | 3/2006 | Johnson et al. | |
| 2007/0071561 A1 * | 3/2007 | Agic | ............................... 407/34 |
| 2008/0226403 A1 | 9/2008 | Craig | |

FOREIGN PATENT DOCUMENTS

| | | |
|---|---|---|
| DE | 102005054434 A1 | 5/2007 |
| WO | 0002693 A1 | 1/2000 |
| WO | 03101655 A1 | 12/2003 |
| WO | 2004050283 A1 | 6/2004 |

OTHER PUBLICATIONS

International Search Report for corresponding International Application PCT/SE2008/051414.

* cited by examiner

*Primary Examiner* — Will Fridie, Jr.
(74) *Attorney, Agent, or Firm* — WRB-IP LLP

(57) ABSTRACT

An indexable milling insert has a parallelepipedic shape. The cutting insert includes a mounting hole placed centrally in the cutting insert, a first support side and a second support side, which support sides are parallel with each other and act as alternating support sides. The cutting insert is provided with main cutting edges, which are orientated perpendicularly to the center axis of the mounting hole as well as provided in such a way that a rotation of the cutting insert around the center axis of the mounting hole to an alternative insert seat alternatively a turning of the cutting insert to an alternative insert seat provides an identical location of the main cutting edges in relation to a piece to be machined. A milling tool equipped with such milling inserts is also provided. The cutting insert can include four identical sides for chip removing machining, the sides extending between the parallel support sides, and each side has exactly two cutting edge areas.

10 Claims, 5 Drawing Sheets

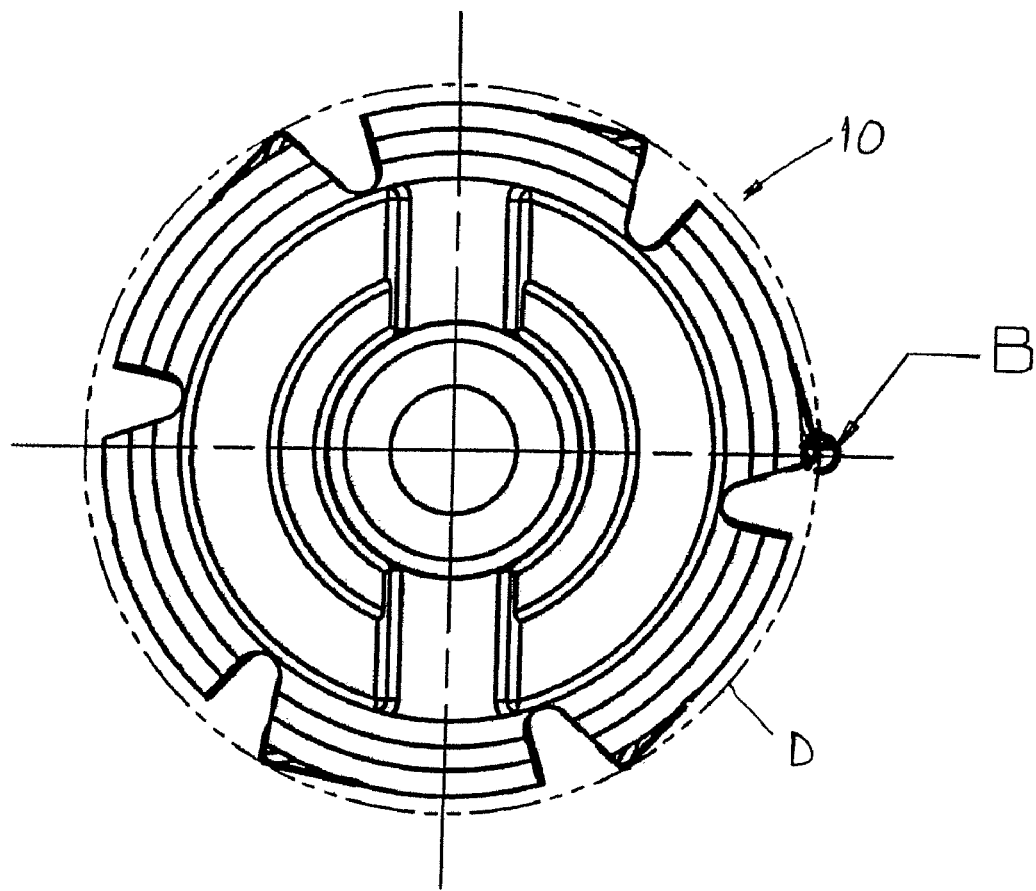
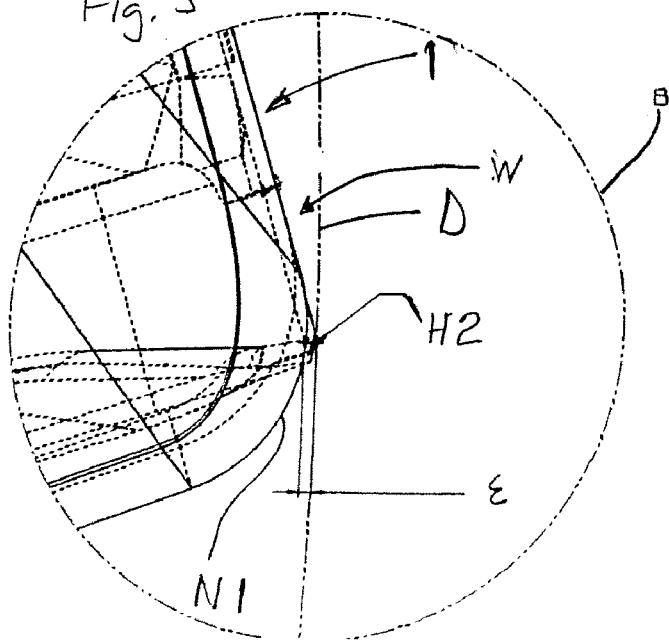

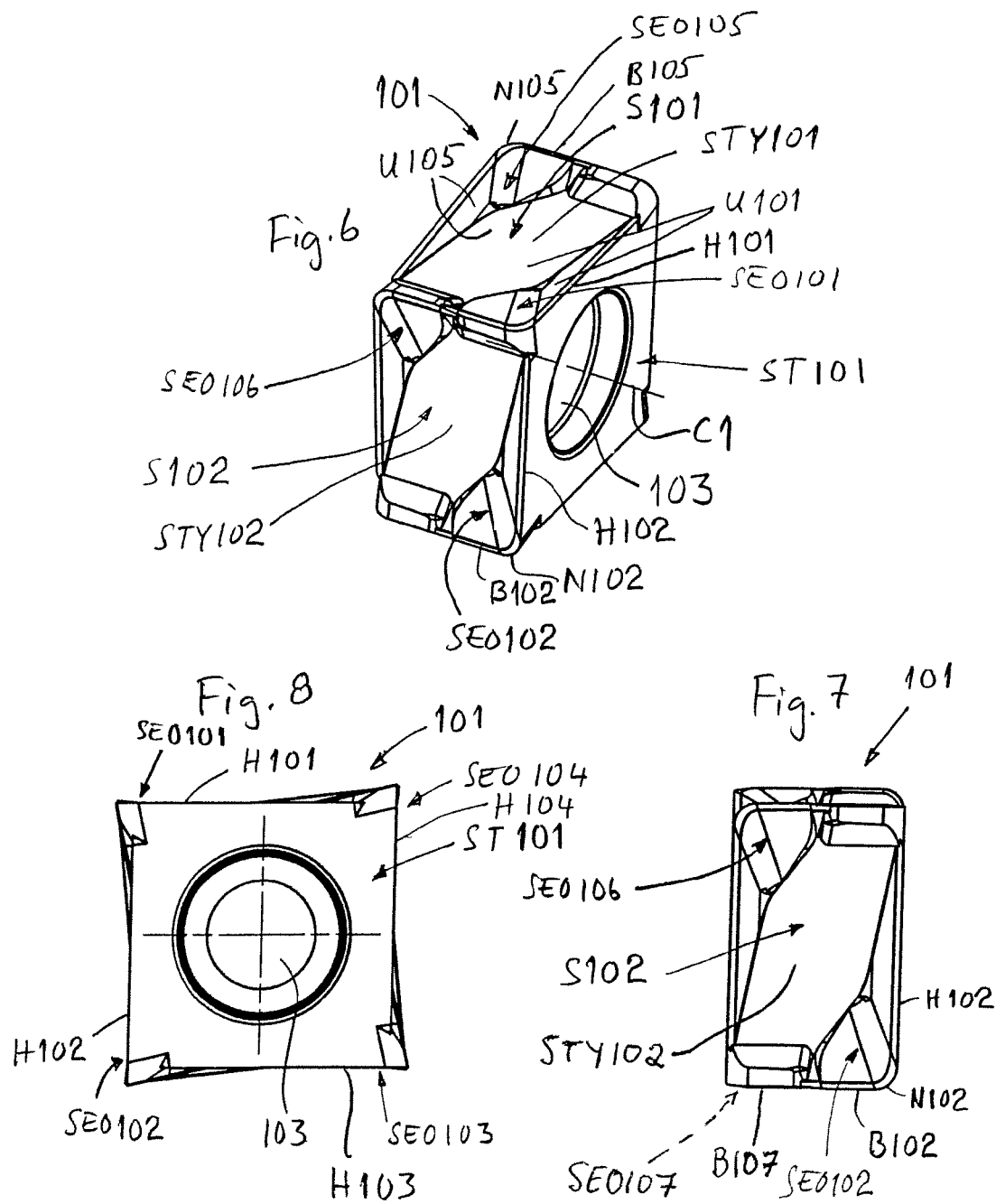

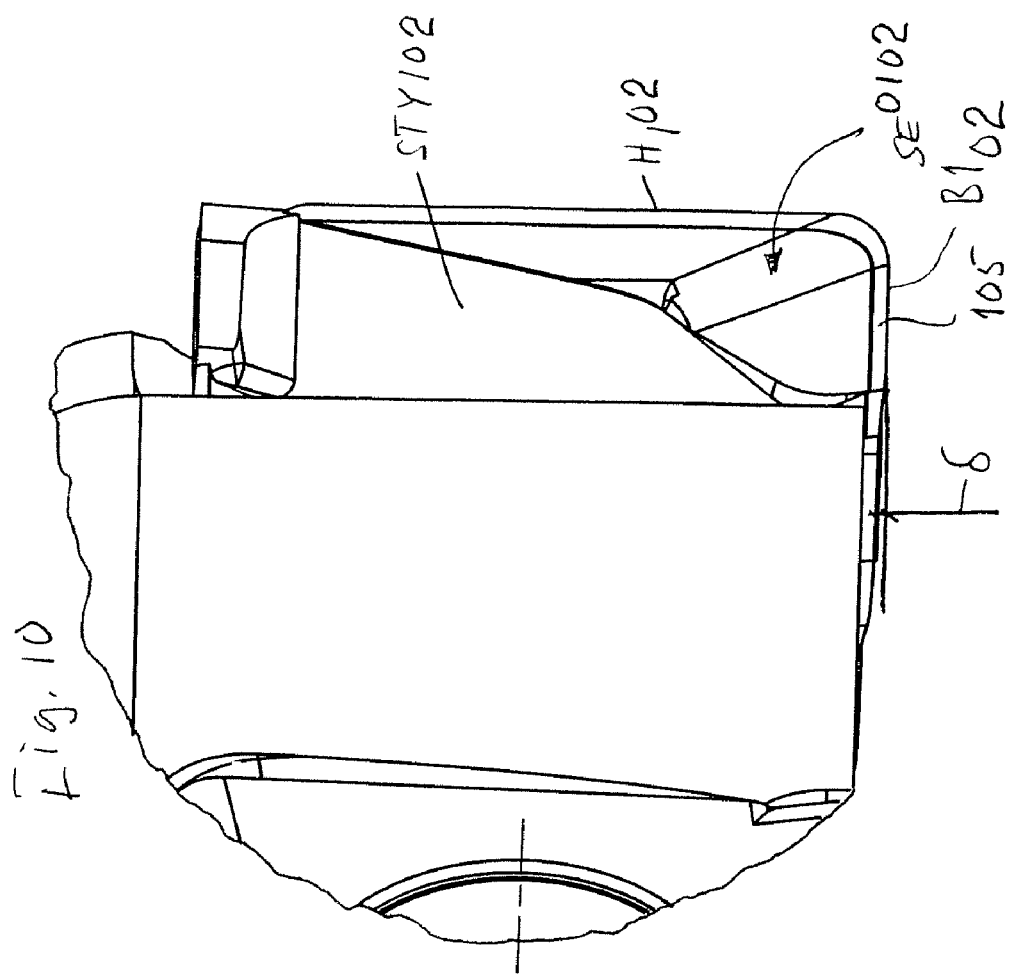
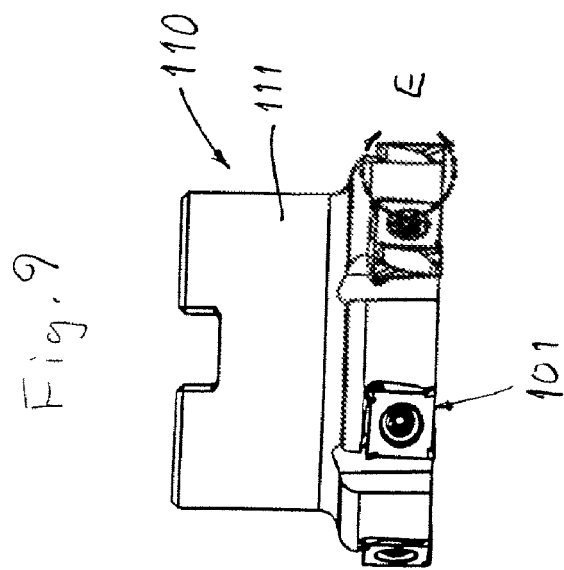

US 7,909,544 B2

CUTTING INSERT AND TOOL FOR CHIP REMOVING MACHINING

BACKGROUND AND SUMMARY

The present invention relates to a cutting insert and a tool for chip removing machining, especially a milling insert and a milling tool. The milling insert is indexable in the milling tool. The milling tool is an end mill having 90° setting angle.

By each one of WO 2003/101655 and WO 2004/050283, a tangential cutting insert as well as a milling tool are previously known. The cutting inserts comprise four cutting corners, which are distributed on two sides for chip removing machining, i.e., each side has two cutting corners.

WO/0002693 shows a milling system having tangentially mounted cutting inserts where each cutting insert has eight cutting corners, which are distributed on two sides for chip removing machining, i.e., each side has four cutting corners. However, four of these cutting corners are intended for clockwise rotary machining and four cutting corners are intended for anticlockwise rotary machining. This means that only four cutting corners can be utilized in one and the same milling tool and that the passive minor cutting edges may be worn during the machining. U.S. Pat. No. 4,597,695 shows another multi-edged cutting insert.

It is desirable to provide a cutting insert and a tool for chip removing machining of the kind defined by way of introduction, the cutting insert being provided with a greater number of cutting corners, which in this case are eight.

It is also desirable to provide the cutting insert with clearances between the cutting corners so that the inactive cutting corners do not interfere with the active cutting corner.

It is also desirable that all cutting corners should be possible to be used for one and the same direction of rotation.

According to an aspect of the present invention,

BRIEF DESCRIPTION OF THE DRAWINGS

Below a preferred embodiment of the invention will be described, reference being made to the accompanying drawings, where:

FIG. 4 shows a planar view of the milling tool according to FIG. 2;

FIG. 5 shows an enlargement of the dash-dotted circle B in FIG. 4;

FIG. 6 shows a perspective view of a second embodiment of a cutting insert according to the present invention;

FIG. 7 shows an end view of the cutting insert according to FIG. 6;

FIG. 8 shows a planar view of the cutting insert according to FIG. 6;

FIG. 9 shows a side view of a milling tool according to the present invention, equipped with cutting inserts according to FIG. 6; and FIG. 10 shows an enlargement of the dash-dotted circle E in FIG. 9.

DETAILED DESCRIPTION

Figure 1:
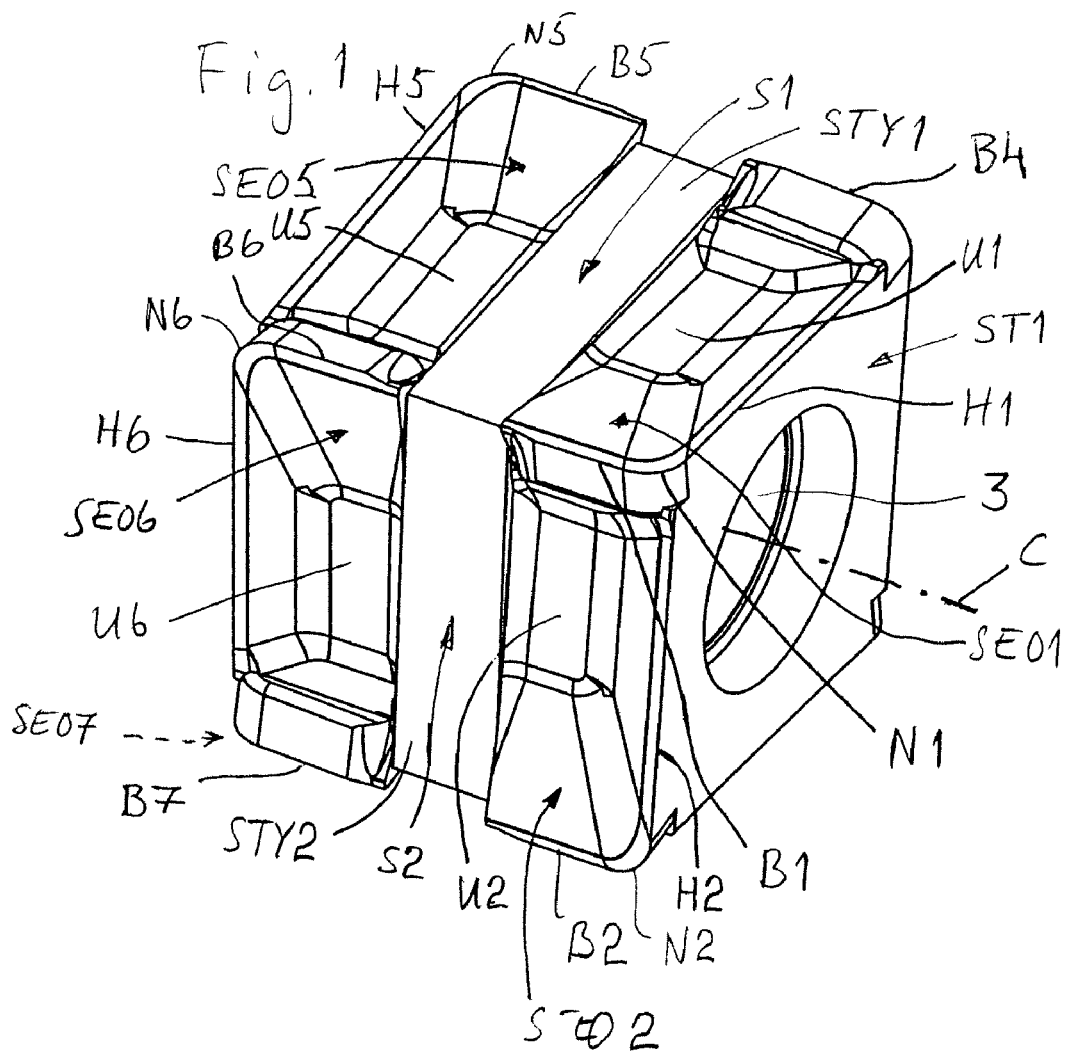
FIG. 1 shows a perspective view of a first embodiment of a cutting insert according to the present invention.

The cutting insert 1 for chip removing machining shown in FIG. 1 constitutes a milling insert, which is four-sided, i.e., it has four active sides. The cutting insert 1 has a parallelepipedic basic shape and is manufactured from pressed or injection moulded cemented carbide. With "cemented carbide", reference is here made to WC, TiC, TaC, NbC etc., in sintered combination with a binder metal such as, for instance, Co or Ni. The cutting insert 1 is preferably at least partly covered with a layer of, e.g., Al2O3, TiN and/or TiCN. In certain cases, it may be justified that the cutting edges comprise or consist of soldered superhard materials such as CBN or PCD.

As is seen in FIG. 1, the cutting insert 1 comprises four sides S1, S2, S3, S4, which are intended for chip removing machining. In FIG. 1, only two sides S1 and S2 are visible. The cutting insert 1 has also two opposite support sides ST1 and ST2, which are parallel with each other. Only the first support side ST1 is visible in FIG. 1. For mounting the cutting insert 1 in an insert seat of a milling body, the cutting insert 1 is provided with a mounting hole 3, which is provided centrally in the cutting insert 1 in respect of the support sides ST1 and ST2. The mounting hole 3 penetrates both the first support side ST1 and the second support side ST2. A centre axis C of the mounting hole 3 defines the axial direction of the milling insert 1.

Each one of the four sides S1-S4 has two cutting edge areas and in total the cutting insert 1 accordingly has eight cutting edge areas SEO1, SEO2, SEO3, SEO4, SEO5, SEO6, SEO7, SEO8. Each one of the four sides S1-S4 also has a support surface STY1, STY2, STY3, STY4. The support surfaces STY1-STY4 have a rectangular shape and adjacent support surfaces STY1-STY4 are interconnected so that they form a "band", which extends around the cutting insert 1.

Each cutting edge area SEO1-SEO8 has a main cutting edge H1, H2, H3, H4, H5, H6, H7, H8 as well as a minor cutting edge B1, B2, B3, B4, B5, B6, B7, B8. Four of the main cutting edges H1, H2, H3, H4 are situated adjacent to the first support side ST1, while the four other main cutting edges H5, H6, H7, H8 are situated adjacent to the second support side ST2. The cutting edges connect to chip surfaces and clearance surfaces, the clearance surface of a cutting edge area, for example SEO1, having been provided essentially transversely to the clearance surface of an adjacent cutting edge area, SEO6.

The main cutting edges H1-H8 and associated minor cutting edges B1-B8 are connected by means of nose cutting edges N1, N2, N3, N4, N5, N6, N7, N8, the first nose cutting edge N1, the second nose cutting edge N2, the fifth nose cutting edge N5 and the sixth nose cutting edge N6 of which are shown in FIG. 1.

To each main cutting edge H1-H8 and minor cutting edge B1-B8, a chip breaking countersunk recess U1, U2, U3, U4, U5, U6, U7, U8 connects, the first U1, the second U2, the fifth U5 and the sixth U6 of which recesses are shown in FIG. 1. These recesses U1-U8 are countersunk in relation to the cutting edges and give the cutting edges a positive rake angle in order to easily cut in a piece to be machined.

Figure 2:
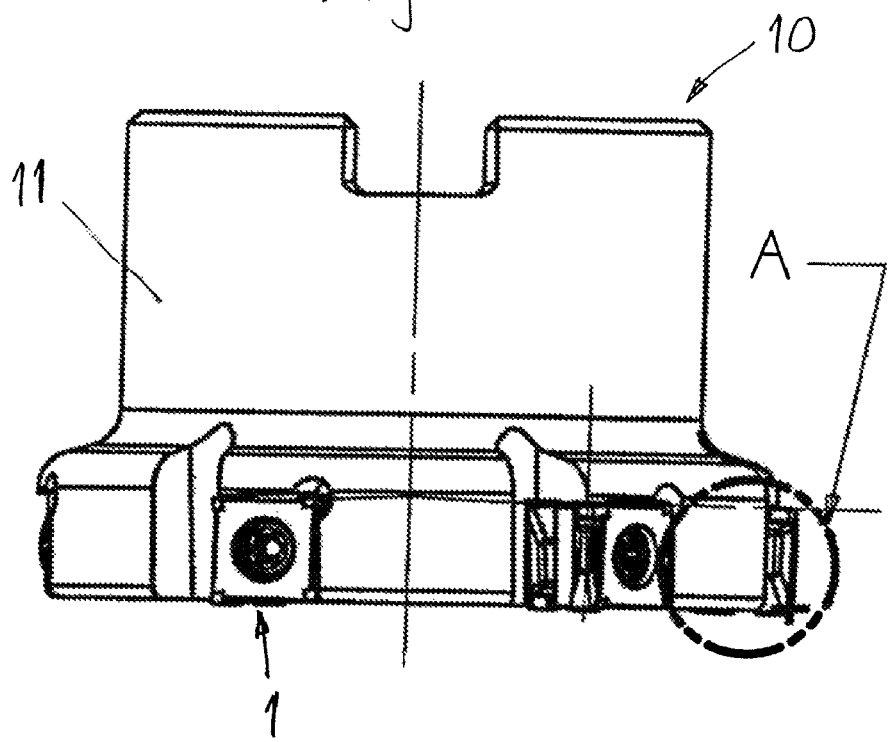
FIG. 2 shows a side view of a milling tool according to the present invention, equipped with cutting inserts according to FIG. 1.

In FIG. 2, a side view of a milling tool 10 according to the present invention is shown, a number of milling inserts 1 according to the present invention being tangentially mounted in insert seats of a milling body 11 of the milling tool 10. With "tangentially mounted", reference is made to a fixing screw being radially or axially screwed into the tool body but not tangentially screwed into the tool body. For the cutting insert, "tangentially mounted" relates to the mounting hole extending essentially parallel with the minor cutting edges of the cutting insert. A support side, e.g., ST2 and two support surfaces S1 and S4 of the milling insert 1 co-operate with the appurtenant insert seat. The milling inserts 1 are anchored in the milling body 11 by screws, which extend through the mounting hole 3 of the respective milling insert 1 and into threaded holes of the milling body 11.

Figure 3:
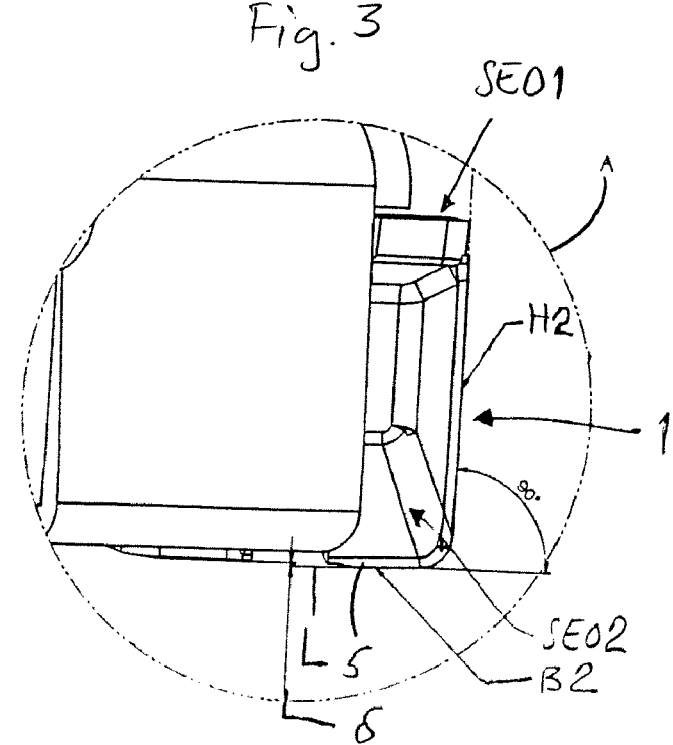
FIG. 3 shows an enlargement of the dash-dotted circle A in FIG. 2.

Each one of the minor cutting edges B1-B8 is provided with a primary chamfer 5, see FIG. 3, where the primary chamfer 5 of the minor cutting edge B2 is shown, wherein the primary chamfer 5 of the minor cutting edge B2 may essentially be situated in the plane of the paper in FIG. 3, while the corresponding primary chamfer of the adjacent minor cutting edge extends transversely to the plane of the paper in FIG. 3. In this connection, it should be pointed out that FIG. 3 accordingly shows the milling insert 1 in the mounted state thereof in the milling tool according to FIG. 2. This entails that in the front view of the cutting insert 1 according to the present invention shown in FIG. 3, the minor cutting edge situated next to the minor cutting edge B2 will be positioned on a higher level than the minor cutting edge B2 in the position of the cutting insert 1 shown in FIG. 3. This level difference is illustrated by means of the distance "δ" in FIG. 3. Normally, the distance δ is in the order of 0.05 mm. Stated another way, an imaginary extension line L of a minor cutting edge B2; B102 for a chosen cutting edge area SEO2; SEO102 is spaced by a distance δ from an adjacent additional minor cutting edge B7; B107 while the adjacent additional minor cutting edge is comprised in a cutting edge area SEO7; SEO107 that faces away from the chosen cutting edge area SEO2. These two cutting edge areas may be perpendicular to each other. The main cutting edge H2 and the minor cutting edge B2 are the active cutting edges, while the adjacent minor cutting edge is inactive by the level difference described above. FIG. 3 illustrates how the cutting insert 1 carries out end milling by 90° setting angle. The main cutting edge H2 and the appurtenant minor cutting edge B2 are in a common plane, wherein accordingly also the primary chamfer 5 of the minor cutting edge B2 may be positioned in this plane. The corresponding applies to other main cutting edges and the appurtenant minor cutting edges.

FIG. 4 shows a planar view of a milling tool 10 according to the present invention. In FIG. 5, an enlarged detail of FIG. 4 is shown. The dash-dotted curved line D symbolizes the effective diameter of the tool, which the cutting tool according to the present invention generates during milling. By the fact that the nose cutting edges N1-N8 have been given a convenient radius of curvature, the nose cutting edge N1 of the cutting edge area SEO1 will be situated inside the main cutting edge H2, as seen in the views according to FIGS. 3 and 5. The distance between the main cutting edge H2 and the nose cutting edge N1 is designated ε in FIG. 5. The distance ε is normally in the order of 0.05 mm.

In FIG. 5 it is also seen that the cutting insert 1 according to the present invention is mounted in the milling body 11 in such a way that there is formed a wedge-shaped clearance W between the cutting insert 1 and the effective diameter D of the milling tool 10.

In FIGS. 6-8, an alternative embodiment of a milling insert 101 according to the present invention is shown, this milling insert 101 also having a parallelepipedic basic shape having four sides S101, S102, S103, S104, which are intended for chip removing machining. The cutting insert 10 also has two opposite support sides ST101 and ST102, which are parallel with each other. For mounting the cutting insert 101 in an insert seat of a milling body, the cutting insert 101 is provided with a mounting hole 103, which is provided centrally in the cutting insert 101 in respect of the support sides ST101 and ST102. The mounting hole 103 penetrates both the first support side ST101 and the second support side ST102. A centre axis C of the mounting hole 103 defines the axial direction of the milling insert 101.

The cutting insert 101 has also eight cutting edge areas SEO101, SEO102, SEO103, SEO104, SEO105, SEO106, SEO107, SEO108, which each one comprises a main cutting edge H101, H102, H103, H104, H105, H106, H107, H108, an appurtenant minor cutting edge B101, B102, B103, B104, B105, B106, B107, B108 as well as an appurtenant nose cutting edge N101, N102, N103, N104, N105, N106, N107, N108.

The most obvious difference in comparison with the embodiment described above is the formation of the support surfaces and the recesses, which are integrated with each other. Such as most clearly is seen in FIGS. 6 and 7, the four support surfaces STY101, STY102, STY103, STY104 extend generally diagonally in a side surface S101-S104, the support surfaces STY101-STY104 also forming a part of the recesses U101, U102, U103, U104, U105, U106, U107, U108 belonging to each cutting edge area SEO101-SEO108. The fact that the support surfaces and the recesses are integrated with each other has as a consequence that the cutting insert 101 has a smaller extension in the axial direction C1 than the cutting insert 1 in the embodiment described above. Also here it is seen that the cutting edges connect to chip surfaces and clearance surfaces, the clearance surface of a cutting edge area, for example SE01O1, having been provided essentially transversely to the clearance surface of an adjacent cutting edge area, SE01O6.

In FIG. 9, a side view of a milling tool 110 according to the present invention is shown, a number of milling inserts 101 according to the present invention being tangentially mounted in insert seats of a milling body 111 of the milling tool 110. In that connection, a support side ST101, ST102 and two support surfaces S101-S104 of the milling insert 101 co-operate with the appurtenant insert seat. The milling inserts 101 are anchored in the milling body 111 by screws, which extend through the mounting hole 103 of the respective milling insert 101 and into threaded holes of the milling body 111.

Correspondingly as in the embodiment described above, each one of the minor cutting edges B101-B108 is provided with a primary chamfer 105, see FIG. 10, where the primary chamfer 105 of the minor cutting edge B102 is shown, the primary chamfer 105 of the minor cutting edge B102 being essentially situated in the plane of the paper in FIG. 10, while the corresponding primary chamfer of the adjacent minor cutting edge extends transversely to the plane of the paper in FIG. 10. In this connection, it should be pointed out that FIG. 10 accordingly shows the milling insert 101 in the mounted state thereof in the milling tool according to FIG. 9. This entails that in the front view of the cutting insert 1 according to the present invention shown in FIG. 10 the minor cutting edge situated next to the minor cutting edge B102 will be positioned on a higher level than the minor cutting edge B102 in the position of the cutting insert 101 shown in FIG. 9. This level difference is illustrated by means of the distance "δ" in FIG. 10. Normally, the distance δ is in the order of 0.05 mm. The main cutting edge H102 and the minor cutting edge B102 are the active cutting edges, while the adjacent minor cutting edge is inactive by the level difference described above. FIG. 10 illustrates how the cutting insert 1 carries out end milling by 90° setting angle. The main cutting edge H102 and the appurtenant minor cutting edge B102 are in a common plane. The corresponding applies to other main cutting edges and the appurtenant minor cutting edges.

As for the distance ε described above which is shown in FIG. 5 the milling insert 101 has the corresponding distance ε, this distance normally being in the order of 0.05 mm.

In the tangential mounting of the milling inserts 101 in the milling body 111, the cutting inserts 101 obtain a corresponding wedge-shaped clearance W as has been described above in connection with FIG. 5.

In a milling insert 1; 101 according to the present invention, all eight cutting edge areas SEO1-SEO8; SEO101-SEO108 can be indexed forward for one and the same direction of rotation of the milling tool 10 according to the present invention.

In the embodiments described above distance ϵ is provided by the fact that the nose cutting edges N1-N8 are given a convenient curvature. However, within the scope of the present invention it is conceivable that the distance is provided by the fact that the nose cutting edges N1-N8 are in the form of chamfers.

The invention claimed is:

1. Indexable milling insert having parallelepipedic basic shape intended to be tangentially mounted in a milling body, the cutting insert comprising a mounting hole placed centrally in the cutting insert, a first support side and a second support side, which support sides are essentially parallel with each other and act as alternating support sides, the mounting hole mouthing in the support sides, the cutting insert being provided with main cutting edges, which are orientated perpendicularly to the centre axis of the mounting hole as well as provided in such a way that a rotation of the cutting insert around the centre axis of the mounting hole or a turning of the cutting insert to an alternative insert seat provides an identical location of the main cutting edges in relation to a piece to be machined, wherein the cutting insert comprises four identical sides for chip removing machining, that the sides extend between the essentially parallel support sides, and that each side has exactly two cutting edge areas, each said cutting edge area also having a minor cutting edge, wherein an imaginary extension line of a minor cutting edge for a chosen cutting edge area is spaced by a distance from an adjacent additional minor cutting edge and in that the adjacent additional minor cutting edge is comprised in a cutting edge area that faces away from the chosen cutting edge area.

2. The milling insert according to claim 1, wherein the cutting edge areas are identical, and that each cutting edge area comprises a main cutting edge, a minor cutting edge as well as an associated nose cutting edge.

3. The milling insert according to claim 2, wherein each nose cutting edge, as seen in planar view, entirely or partly, is defined by a radius of curvature.

4. The milling insert according to claim 2, wherein each nose cutting edge, as seen in planar view, is chamfered.

5. The milling insert according to claim 1, wherein each minor cutting edge has an extension transverse to the appurtenant main cutting edge.

6. The milling insert according to claim 1, wherein each minor cutting edge has a primary chamfer, and that the primary chamfer and the appurtenant main cutting edge are essentially situated in a common plane.

7. The milling insert according to claim 1, wherein each cutting edge area comprises a chip breaking recess.

8. The milling insert according to claim 1, wherein each side for chip removing machining has a support surface.

9. The milling insert according to claim 1, wherein the cutting edges connect to chip surfaces and clearance surfaces, the clearance surface of a cutting edge area having been provided essentially transversely to the clearance surface of an adjacent cutting edge area.

10. Milling tool comprising a milling body having a plurality of insert seats, wherein each insert seat is adapted to receive a milling insert according to claim 1 and wherein the milling inserts are tangentially mounted in the milling body and in that minor cutting edge and main cutting edge form 90° with each other in projection when the milling tool is rotated.

* * * * *